United States Patent
Agrawal et al.

(10) Patent No.: US 11,816,275 B1
(45) Date of Patent: Nov. 14, 2023

(54) IN-AIR CONTROL REGIONS

(71) Applicant: INTERNATIONAL BUSINESS MACHINES CORPORATION, Armonk, NY (US)

(72) Inventors: Tushar Agrawal, West Fargo, ND (US); Thomas Jefferson Sandridge, Tampa, FL (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/816,761

(22) Filed: Aug. 2, 2022

(51) Int. Cl.
*G06F 3/0346* (2013.01)
*G06F 3/038* (2013.01)
*G06F 3/0354* (2013.01)
*G06F 3/01* (2006.01)

(52) U.S. Cl.
CPC ............ *G06F 3/0346* (2013.01); *G06F 3/016* (2013.01); *G06F 3/038* (2013.01); *G06F 3/03545* (2013.01)

(58) Field of Classification Search
CPC ................. G06F 3/016; G06F 3/03545; G06F 2203/04101; G06F 2203/04108; G06F 3/0346; G06F 3/041–04897; G06F 3/038
See application file for complete search history.

(56) References Cited

U.S. PATENT DOCUMENTS

| | | | |
|---|---|---|---|
| 7,532,196 B2 | 5/2009 | Hinckley | |
| 9,639,207 B2 | 5/2017 | Pollmann | |
| 10,248,226 B2 | 4/2019 | Gordon | |
| 10,506,068 B2 | 12/2019 | Bakshi | |
| 10,761,569 B2 | 9/2020 | Klein | |
| 11,023,070 B2 | 6/2021 | Chen | |
| 11,209,937 B2 | 12/2021 | Yoganandan | |
| 11,281,298 B1 | 3/2022 | Kamepalli | |
| 2013/0135212 A1 | 5/2013 | Cheng | |
| 2015/0143395 A1 | 5/2015 | Reisman | |
| 2016/0004300 A1* | 1/2016 | Baic | G06F 3/0346 345/419 |
| 2017/0126658 A1 | 5/2017 | Black | |
| 2017/0160856 A1 | 6/2017 | Pillarisetty | |

(Continued)

OTHER PUBLICATIONS

"Mobile App Development Platform", IBM, Downloaded from the Internet on Jun. 17, 2022, 18 pgs., <https://www.ibm.com/cloud/mobile>.

(Continued)

*Primary Examiner* — Temesghen Ghebretinsae
*Assistant Examiner* — Ivelisse Martinez Quiles
(74) *Attorney, Agent, or Firm* — James L. Olsen

(57) ABSTRACT

Aspects of the present disclosure relate to in-air control regions. Communication between an electronic pen and a device can be established. Two or more in-air control regions above the device can be defined, each in-air control region specifying a set of functions that can be performed by the electronic pen. A determination can be made that the electronic pen is within a first in-air control region of the two or more in-air control regions, the first in-air control region specifying a first set of functions that can be performed by the electronic pen. In response to input received from the electronic pen within the first in-air control region, at least one function of the first set of functions can be executed.

18 Claims, 4 Drawing Sheets

(56) References Cited

U.S. PATENT DOCUMENTS

| | | | |
|---|---|---|---|
| 2017/0205939 A1* | 7/2017 | Lv | G06F 3/042 |
| 2018/0349690 A1 | 12/2018 | Rhee | |
| 2019/0101754 A1 | 4/2019 | Bharti | |
| 2019/0286253 A1* | 9/2019 | Kwon | G06F 3/04817 |
| 2020/0310561 A1 | 10/2020 | Connellan | |
| 2020/0310587 A1 | 10/2020 | Huang | |
| 2022/0078354 A1 | 3/2022 | Hwajun | |
| 2022/0083156 A1 | 3/2022 | Munakata | |

OTHER PUBLICATIONS

"Ready your mobile workforce with Apple and IBM", IBM, Downloaded from the Internet on Jun. 17, 2022, 6 pgs., <https://www.ibm.com/services/apple-services>.

Alsop, T., "Tablets—Statistics & Facts", Statista, Technology & Telecommunications, Hardware, Apr. 21, 2022, 6 pgs., <https://www.statista.com/topics/841/tablets/>.

Biener, et al., "PoVRPoint: Authoring Presentations in Mobile Virtual Reality", In IEEE Transactions on Visualization and Computer Graphics, Jan. 17, 2022, 11 pgs., <https://doi.org/10.48550/arXiv.2201.06337>.

Grossman, et al., "Hover Widgets: Using The Tracking State To Extend The Capability of Pen-Operated Devices", CHI 2006, Apr. 22-28, 2006, Montréal, Québec, Canada, 10 pgs.

Jakoda, et al., "AirFlip : A Double Crossing in-Air Gesture Boundary Surfaces of Hover Zone For Mobile Devices", Human-Computer Interaction, Part II, HCII 2015, LNCS 9170, 10 pgs., 2015, DOI: 10.1007/978-3-319-20916-6 5.

Kruijff, et al., "Multilayer Haptic Feedback For Pen-Based Tablet Interaction", Proceedings of the 2019 CHI Conference on Human Factors in Computing Systems, CHI 2019 Paper, Paper No. 143, May 2019, 14 pgs., <https://doi.org/10.1145/3290605.3300373>.

Ulquinaku, et al., "Using Hover to Compromise The Confidentiality of User Input on Android", In Proceedings of WiSec '17 , Boston, MA, USA, Jul. 18-20, 2017, 11 pages. <https://doi.org/10.1145/3098243.3098246>.

International Search Report and Written Opinion for Application PCT/CN2023/099021, dated Sep. 14, 2023, 8 pages.

* cited by examiner

US 11,816,275 B1

IN-AIR CONTROL REGIONS

BACKGROUND

The present disclosure relates generally to the field of computing, and in particular, to in-air control regions.

Electronic pens (i.e., smart pens or digital pens) are input devices that allow users to interact with electronic devices such as tablets and cell phones. Handwriting data generated by a user using an electronic pen can be digitized for use on an electronic device. Digital pens can contain internal electronic features facilitating input interactions, memory storage, and data transmission capabilities.

SUMMARY

Embodiments of the present disclosure are directed to a method, system, and computer program product for in-air control region operation. Communication between an electronic pen and a device can be established. Two or more in-air control regions above the device can be defined, each in-air control region specifying a set of functions that can be performed by the electronic pen. A determination can be made that the electronic pen is within a first in-air control region of the two or more in-air control regions, the first in-air control region specifying a first set of functions that can be performed by the electronic pen. In response to input received from the electronic pen within the first in-air control region, at least one function of the first set of functions can be executed.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
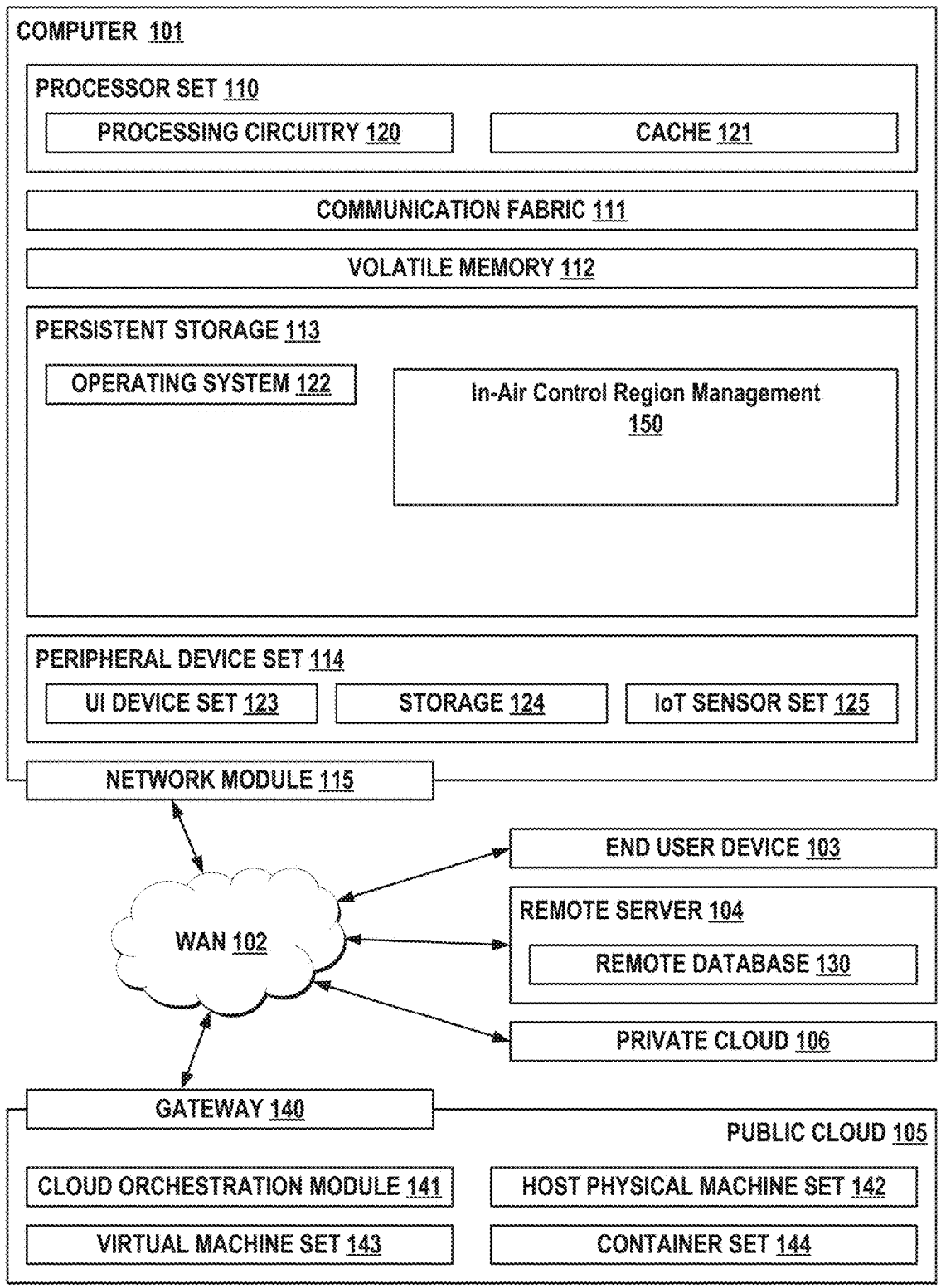
FIG. 1 is a high-level block diagram illustrating an example computer system and network environment that can be used in implementing one or more of the methods, tools, modules, and any related functions described herein, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing, and in particular, to in-air control regions. While the present disclosure is not necessarily limited to such applications, various aspects of the disclosure can be appreciated through a discussion of various examples using this context.

Electronic pens (i.e., smart pens or digital pens) are input devices that allow users to interact with electronic devices such as tablets and cell phones. Handwriting data generated by a user using an electronic pen can be digitized on an electronic device. Digital pens can contain internal electronic features facilitating input interactions, memory storage, and data transmission capabilities.

Touch screen commands are typically issued between electronic pens and electronic devices. For example, a user can handwrite on a touch screen of an electronic device using an electronic pen, and the analog data associated with the handwriting can be translated into digital data. This can allow users to handwrite on electronic devices in a similar manner to a pen and paper. Electronic pens can be used for a variety of interface tasks such as writing, mode switching, and scrolling.

In some instances, there may not be a suitable physical surface for an electronic pen to interface (e.g., if a touch screen is covered, obstructed, or otherwise unavailable). In these situations, in-air commands (e.g., midair commands, hover commands, etc.) can be issued on electronic devices using electronic pens. These commands do not require direct physical contact between an electronic pen and a touch screen. Rather, the command is received in-air above the device. However, in-air command functionality is currently limited. For example, in-air commands typically do not account for the distance between the electronic pen and the electronic device touch screen. Further, in-air commands do not vary in functionality based on distance between the electronic pen and the electronic device touch screen.

Aspects of the present disclosure relate to in-air control regions. Communication (e.g., pairing) between an electronic pen and a device can be established. Two or more in-air control regions above the device can be defined, each in-air control region specifying a set of functions that can be performed by the electronic pen. A determination can be made that the electronic pen is within a first in-air control region of the two or more in-air control regions, the first in-air control region specifying a first set of functions that can be performed by the electronic pen. In response to input received from the electronic pen within the first in-air control region, at least one function of the first set of functions can be executed.

Aspects of the present disclosure provide various improvements over existing in-air command functionality. Because aspects of the present disclosure are directed to multiple in-air control regions above a device that vary in functionality, additional control options are available for users. For example, a user can simply change the height (e.g., or other dimension) of their electronic pen with respect to a device and execute different functionalities (e.g., using the same or similar input mechanisms). Further, because aspects of the present disclosure relate to visualizing the various in-air control regions above the device (e.g., via extended reality (XR) technology and holographic projection technology), usability of in-air command systems are enhanced as users can readily ascertain in-air control regions they are currently interacting with.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as in-air control region management 150. In addition, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some or all of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, mixed reality (MR) headset, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
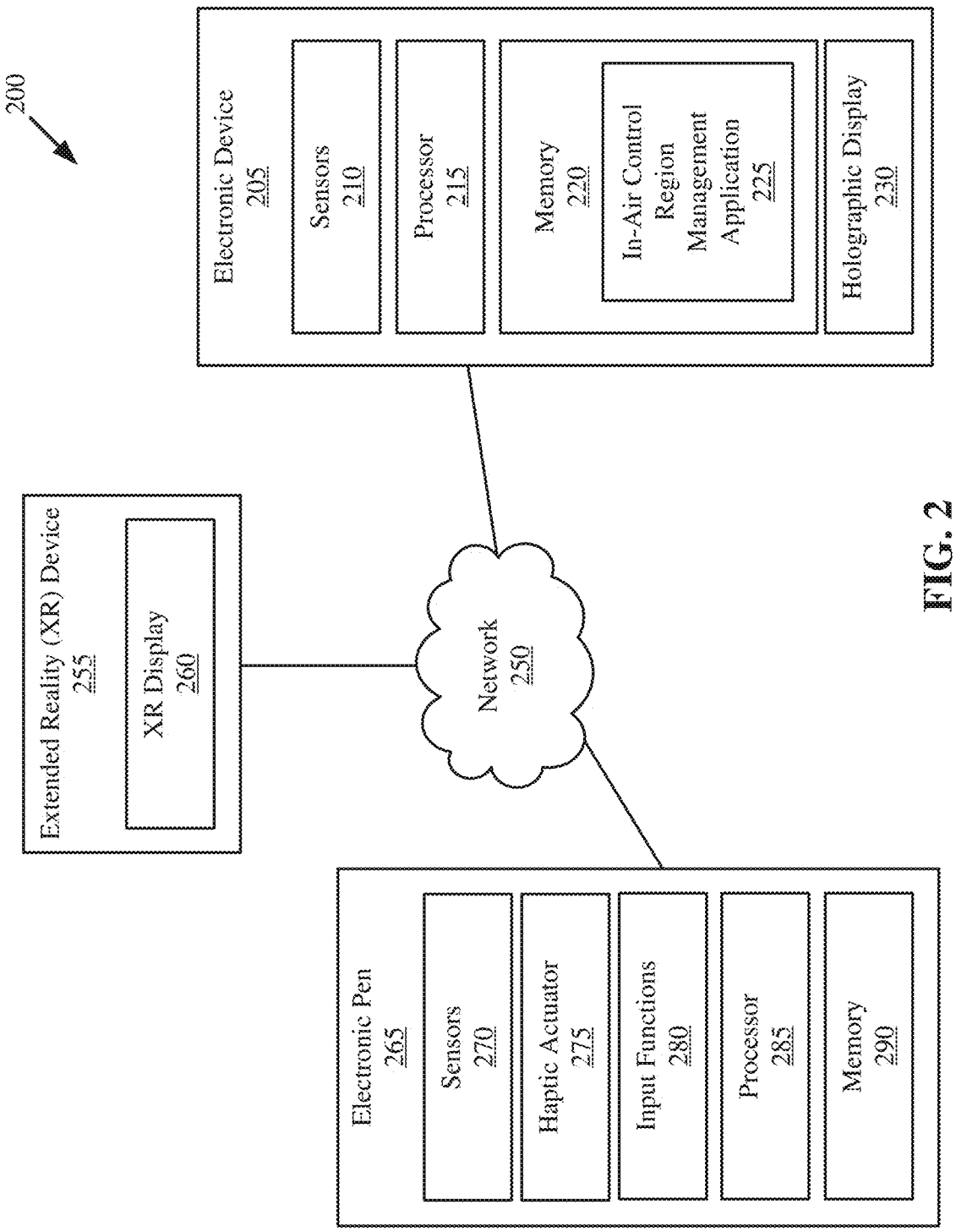
FIG. 2 is a block diagram illustrating an example computing environment in which illustrative embodiments of the present disclosure can be implemented.

Turning now to FIG. 2, shown is a block diagram illustrating an example computing environment 200 in which illustrative embodiments of the present disclosure can be implemented. Computing environment 200 includes an electronic device 205, an electronic pen 265, and an extended reality (XR) device 255. The electronic device 205, electronic pen 265, and XR device 255 can be distant from each other and communicate over a network 250. The network 250 can be the same as, or substantially similar to, WAN 102 described with respect to FIG. 1. In embodiments, network 250 can be a local area network (LAN) or any other suitable network topology (e.g., peer-to-peer).

The electronic device 205 and electronic pen 265 each include processors 215, 285 and memories 220, 290 respectively. The processors 215 and 285 can be the same as, or substantially similar to, processor set 110 described with respect to FIG. 1. Memories 220 and 290 can be the same as, or substantially similar to, volatile memory 112 and/or persistent storage 113 described with respect to FIG. 1. Functionalities described herein can be executed by one or more processors 215 of the electronic device, one or more processors 285 of the electronic pen, and/or one or more processors of a remote computing system (e.g., a server, not shown).

An in-air control region management application 225 of the electronic device 205 can be configured to receive in-air input commands from the electronic pen 265. An "in-air input command," "in-air command," or "in-air control" is a command/control that is received within 3-dimensional (3-D) space in-air in an environment of the device (e.g., a midair command, a hover command, etc.). While reference may be made to in-air control regions/commands defined/received "above the surface of a device," in-air control regions/commands can be defined/received in any suitable spatial orientation with respect to the device (e.g., adjacent to or below). An in-air input command can be detected by one or more sensors of participating devices (e.g., sensors 270 of electronic pen or sensors 210 of electronic device 205) and translated into a corresponding action or output. In-air commands executed from the electronic pen 265 can be processed based on defined in-air control regions above the electronic device 205. "In-air control regions" specify 3-D areas above the electronic device 105 where in-air command execution from the electronic pen 265 can be received (e.g., see FIG. 2). Two or more in-air control regions can be defined above the electronic device 205. Each in-air control region can define a set of commands, functionalities, and/or permissions that can be performed by the electronic pen 265.

Sensors 210 of the electronic device 205 and/or sensors 270 of the electronic pen 265 can be configured to track the position of the electronic pen 265 with respect to the position of the electronic device 205. Thus, during operation, an in-air control region that the electronic pen 265 is positioned within while executing functionalities (e.g., via input functions 280) can be determined such that appropriate functions are executed according to the current in-air region the electronic pen 265 is positioned within. Tracking of the electronic pen 265 position with respect to the electronic device 205 can be continuous. That is, sensors 210 and 270 can constantly track the position of the electronic pen 265 to determine whether the electronic pen is within an in-air control region of the electronic device 205, the specific in-air control region the electronic pen 265 is within, and whether the electronic pen 265 transitions between in-air control regions of the electronic device 205.

The sensors 210 and 270 can be light-based (e.g., cameras, optical sensors, infrared sensors, light detection and ranging (LIDAR) sensors, etc.), movement-based (e.g., accelerometers, gyroscopes, etc.), sound-based (e.g., ultrasonic sensors, microphones, etc.), touch-based (e.g., capacitive sensors, haptic sensors, etc.), and network based (e.g., sensors implemented in indoor positioning systems (IPS) such as global positioning system (GPS) sensors, wireless network sensors (e.g., Wi-Fi or Bluetooth positioning systems), received signal strength indicator (RSSI) sensors, etc.). In embodiments, two or more of the above-referenced sensor types can collectively be implemented and used to track the position of the electronic pen 265 with respect to in-air control regions of the electronic device 205.

In embodiments, if a determination is made (e.g., based on sensor data collected from sensors 210 and 270) that the electronic pen transitions from a first in-air control region to a second in-air control region, then a haptic actuator 275 of the electronic pen can be configured to provide haptic feedback regarding the in-air control region transition. This can be completed such that a user of the electronic pen 265 can be notified regarding any in-air control region changes that occur. This can allow the user to execute functionalities according to the in-air control region the electronic pen 265 is currently within. This can further allow users to be notified of in-air control region transitions as they occur (e.g., whether intentional or unintentional). However, in embodiments, any other suitable notification of an in-air control region transition can be completed. For example, visual and/or audio indications (e.g., a message displayed on electronic device 205 or sound emitted from the electronic device 105) can be issued from the electronic device 205 and/or electronic pen 265 to notify the user of the in-air control region transition.

In embodiments, the in-air control regions generated by in-air control region management application 225 can be displayed to the user via an XR device 255. The XR device 255 can be a virtual reality (VR), augmented reality (AR), or mixed reality (MR) display device configured to display virtual visual data to users, among other potential sensor data (e.g., haptic and auditory data). The XR device 255 can be implemented using any suitable VR, AR, and/or MR technology, including tracking sensors, one or more virtual boundaries, indoor positioning system functions, a head-mounted display (HMD), graphical processing capabilities, data transmission capabilities, etc. An XR display 260 of the XR device 255 can be configured to display the geometry (e.g., the 3-D areas) of each in-air control region above the electronic device 205. This can enhance usability of the system as users can visualize the in-air control regions they are currently interacting with. Display of the in-air regions via the XR display 260 can include virtual boundaries/perimeters depicting the bounds of each in-air control region.

In embodiments, as opposed to or in addition to viewing in-air boundary control regions via XR display 260, a holographic display 230 of the electronic device 205 can be configured to project a hologram depicting the geometry of each in-air control region above the electronic device 205. Holographic displays use light, such as that created by a laser, to create a 3-D image in space (e.g., in-air above device 205). This can allow users to view virtual boundaries/perimeters depicting the bounds of each in-air control region without requiring the user to wear an XR device (e.g., XR device 255).

The in-air control regions of the in-air control region management application 225 can be defined in any suitable manner. In embodiments, a user can manually define in-air control regions. For example, a user can manually trace, designate, or otherwise map out in-air control regions they desire. Tracing boundaries for in-air control regions can include a user drawing (e.g., in-air above a device or on a surface of a device) in-air control region geometries. The traced boundaries can then be defined as 3-D in-air control regions based on the size and shape of the boundary drawn by the user. In embodiments, the traced boundaries can be detected by sensors 210 of electronic device 205 or sensors 270 of electronic pen 265 (e.g., if electronic pen 265 if performing the tracing).

However, manual definition of in-air control regions can be completed in any suitable manner. For example, definition within a software application (e.g., in-air control region management application 225) can be completed. For instance, a user can define dimensions (e.g., within input fields of the software application) specifying geometries of in-air control regions they desire. As a specific example, for rectangular or square in-air control region geometries, a user can indicate a desired height, width, and/or length of a rectangular in-air control region, as well as a starting distance from the electronic device 205 from which the rectangular in-air control region is projected. As another specific example, for circular geometries, the user can indicate a circumference, radius, diameter, and/or height of a circular in-air control region, as well as a starting distance from the electronic device 205 from which the circular in-air control region is projected. Manual definition can be completed for each of a plurality of in-air control regions.

In embodiments, in-air control regions can be automatically generated. For example, in some embodiments, automatic generation of in-air control regions can be completed based on sensor precision/accuracy. As an example, if sensors 210 and/or sensors 270 can only distinguish distance between the device 205 and electronic pen 265 accurately down to 5 centimeters (cm) (e.g., in a height direction above the surface of the electronic device), then a minimum distance between in-air control regions can be set to at least 5 cm. As another example, in-air control regions can be automatically generated based on historically captured in-air command data. For example, distances that users historically issue in-air commands from can be ingested as input data by a machine learning (ML)/artificial intelligence (AI) algorithm, and the ML/AI algorithm can output in-air control region geometries based on the historically issued in-air command data. Any suitable AI/ML algorithm can be used to automatically generate in-air control regions, including, but not limited to, supervised learning (e.g., support vector machines), unsupervised learning, (e.g., clustering), reinforcement learning (e.g., Markov decision based models), and/or deep learning (e.g., artificial neural networks).

In embodiments, definition of in-air control region placement and geometry can be completed in part manually and in part automatically. For example, two dimensions (e.g., length and width) of an in-air control region can be defined manually (e.g., based on user input) while a third dimension (e.g., height) of the in-air control region can be defined automatically (e.g., based on sensor precision). Similarly, a first in-air control region can be manually defined (e.g., traced by a user) while a second in-air control region can be automatically generated by an ML/AI algorithm (e.g., deep learning). Aspects of the present disclosure recognize that definition of in-air control region geometries and placement can be completed in any suitable manner, and are not limited to those described.

In embodiments, commands, functionalities, and/or permissions associated with each of the defined in-air control regions can be defined. Defining commands, functionalities, and/or permissions associated with each in-air control region can be completed manually or automatically. For example, a user can specify that a first set of commands, functions, or permissions can be executed within a first in-air control region and a second set of commands, functions, or permissions can be executed within a second in-air control region within in-air control region management application 225. As another example, commands, functionalities, and/or permissions associated with each in-air control region can be automatically defined based on historical in-air command data via a ML/AI algorithm. For example, historical data capturing the types of commands, types of functions, and/or permissions completed for historically issued in-air commands by the electronic pen 265 at particular distances/locations from the electronic device 205 can be captured and used to dictate/assign commands, functions, and/or permissions to each in-air control region.

Any suitable commands, functions, and/or permissions can be mapped to in-air control regions. As an example, a zoom-in command may only be permitted to be performed within a first in-air control region, while a zoom-out command may only be permitted to be performed within a second in-air control region. As another example, read permission may only be granted within a first in-air control region and read/write permission may only be granted within a second in-air control region. As another example, a first function (e.g., draw) may only be completed within a first in-air control region while a second function (e.g., erase) may only be completed within a second in-air control region. In embodiments, a first set of commands, functions, and/or permissions can be assigned to respective in-air control regions manually and a second set of commands, functions and/or permissions can be assigned to respective in-air control regions automatically. In embodiments, input functions 280 (e.g., buttons, dials, switches, etc.) of electronic pen 265 can be mapped to specific functionalities within each in-air control region. For example, a first button of the electronic pen 265 may perform a first function within a first in-air control region, while the first button of the electronic pen 265 may perform a second function within a second in-air control region.

In embodiments, multiple devices (e.g., additional electronic devices, not shown) can each have a set of defined in-air control regions and corresponding commands, functions, and/or permissions mapped to each in-air control region. In these embodiments, corresponding sensors can be configured to track electronic pen 265 position such that appropriate functionalities can be performed according to an in-air control region the electronic pen 265 is determined to be within. In embodiments, if in-air control regions of multiple respective devices overlap, functionalities of each device associated with each in-air control region can be executed simultaneously.

It is noted that FIG. 2 is intended to depict the representative major components of an example computing environment 200. In some embodiments, however, individual components can have greater or lesser complexity than as represented in FIG. 2, components other than or in addition to those shown in FIG. 2 can be present, and the number, type, and configuration of such components can vary. For example, though FIG. 2 depicts in-air control region management application 225 as stored within memory 220 of electronic device 205, in embodiments, in-air control region management application 225 can be stored remotely on a server. In these embodiments, data ingested by in-air control region management application 225 can be remotely processed by the remote server.

Figure 3:
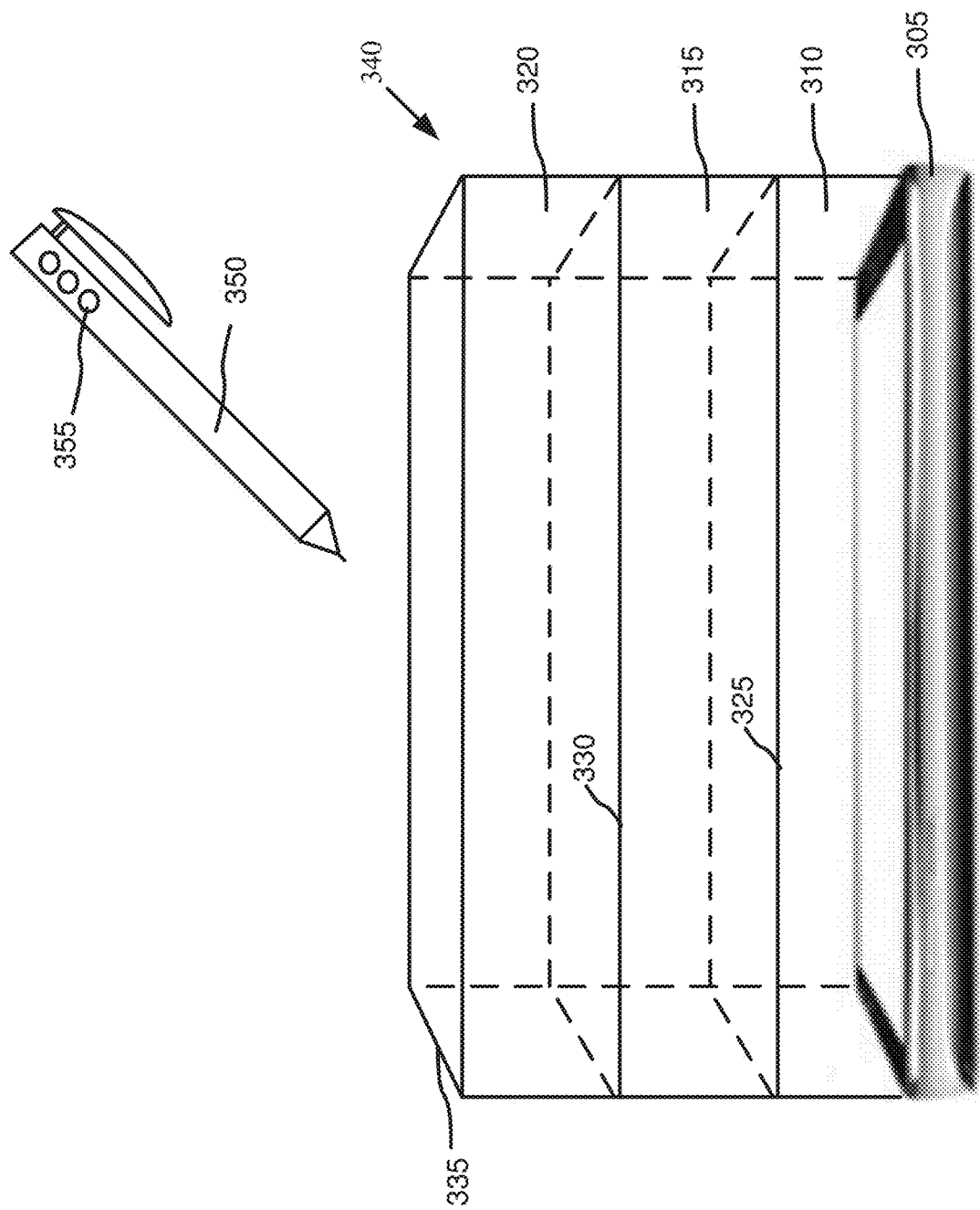
FIG. 3 is a diagram illustrating an example in-air control region configuration implemented between a device and an electronic pen, in accordance with embodiments of the present disclosure.

Referring now to FIG. 3, shown is diagram illustrating an example in-air control region configuration, in accordance with embodiments of the present disclosure. As shown in FIG. 3, in-air control regions 340 are displayed above a device 305 (e.g., computer 101 or electronic device 205). The in-air control regions 340 include a first in-air control region 310 closest to device 305, a third in-air control region 320 farthest from the device 305, and a second in-air control region 315 in between the first in-air control region 310 and second in-air control region 320. The first in-air control region 310 and second in-air control region are separated by a first virtual boundary 325. The second in-air control region 315 and third in-air control region 320 are separated by a second virtual boundary 330. The end-point of the third in-air control region 320 is designated by a third virtual boundary 335.

Each of in-air control regions 340 can be mapped to a set of commands, functions, and/or permissions that can be completed within each in-air control region. Execution of the defined set of commands, functions, and/or permissions of each in-air control region can be completed by an electronic pen 350. A location of the electronic pen 350 (e.g., the tip of the electronic pen) with respect to the in-air control regions 340 can be determined continuously (e.g., via sensors 210 and/or 270) such that appropriate functions, commands, and/or permissions can be executed/enforced. In embodiments, input functions 355 (e.g., depicted as buttons) of electronic pen 350 can be used to input commands from electronic pen 350 within each in-air control region. In embodiments, the functionality of an input command performed by the electronic pen 350 can vary based on the in-air control region the electronic pen 350 is within. For example, a first input button of the electronic pen 350 executed within the first in-air control region can lead to a first function (e.g., draw), while the first input button of the electronic pen 350 executed within the second in-air control region can lead to a second function (e.g., erase).

As discussed with respect to FIG. 2, the in-air control regions 340 can be visually displayed by an XR device worn by a user and/or via holographic projection above the device 305. This can allow users to readily ascertain the in-air control region they are currently interacting with. Additionally, feedback (e.g., haptic, auditory, and/or visual feedback) can be presented to a user when they enter a new in-air control region with the electronic pen 350 (e.g., transition from the first in-air control region 310 to the second in-air control region 315 or originally enter the third in-air control region 320). By providing sensory data to users to indicate in-air control regions they are currently interacting with, usability of the system is enhanced.

Though the in-air control regions 340 of FIG. 3 are depicted as rectangular, in embodiments, any suitable geometry of in-air control regions can be implemented (e.g., circular, elliptical, hexagonal, etc.). The dimensions of in-air control regions can vary, and may be manually or automatically defined. In embodiments, the geometry of each in-air control region can differ. For example, the first in-air control region 310 can be rectangular, the second in-air control region 315 can be circular, and the third in-air control region 320 can be triangular. In embodiments, the size of the in-air control regions can vary based on distance. For example, the first in-air control region 310 can be the smallest (e.g., an apex of a pyramid), the second in-air control region can be mid-sized (e.g., the middle of a pyramid), and the third in-air control region can be the largest (e.g., the base of the pyramid). Further, the placement of in-air control regions (e.g., the starting distance from the device 305) can vary. For example, though the first in-air control region 310 is depicted as starting directly above device 305, in embodiments, the first in-air control region 310 can be offset to begin a particular distance (e.g., 10 cm) above the device.

While reference is made to tracking a position of the electronic pen 350 with respect to the in-air control regions, aspects of the present disclosure recognize that a first portion of the electronic pen 350 (e.g., the tip) may be within a first in-air control region and a second portion of the electronic pen 350 (e.g., the end) may be within a second in-air control region. Aspects of the present disclosure recognize that tracking can be performed for a single component (e.g., the tip) of the electronic pen 350 such that accurate positioning/command execution can be achieved.

Figure 4:
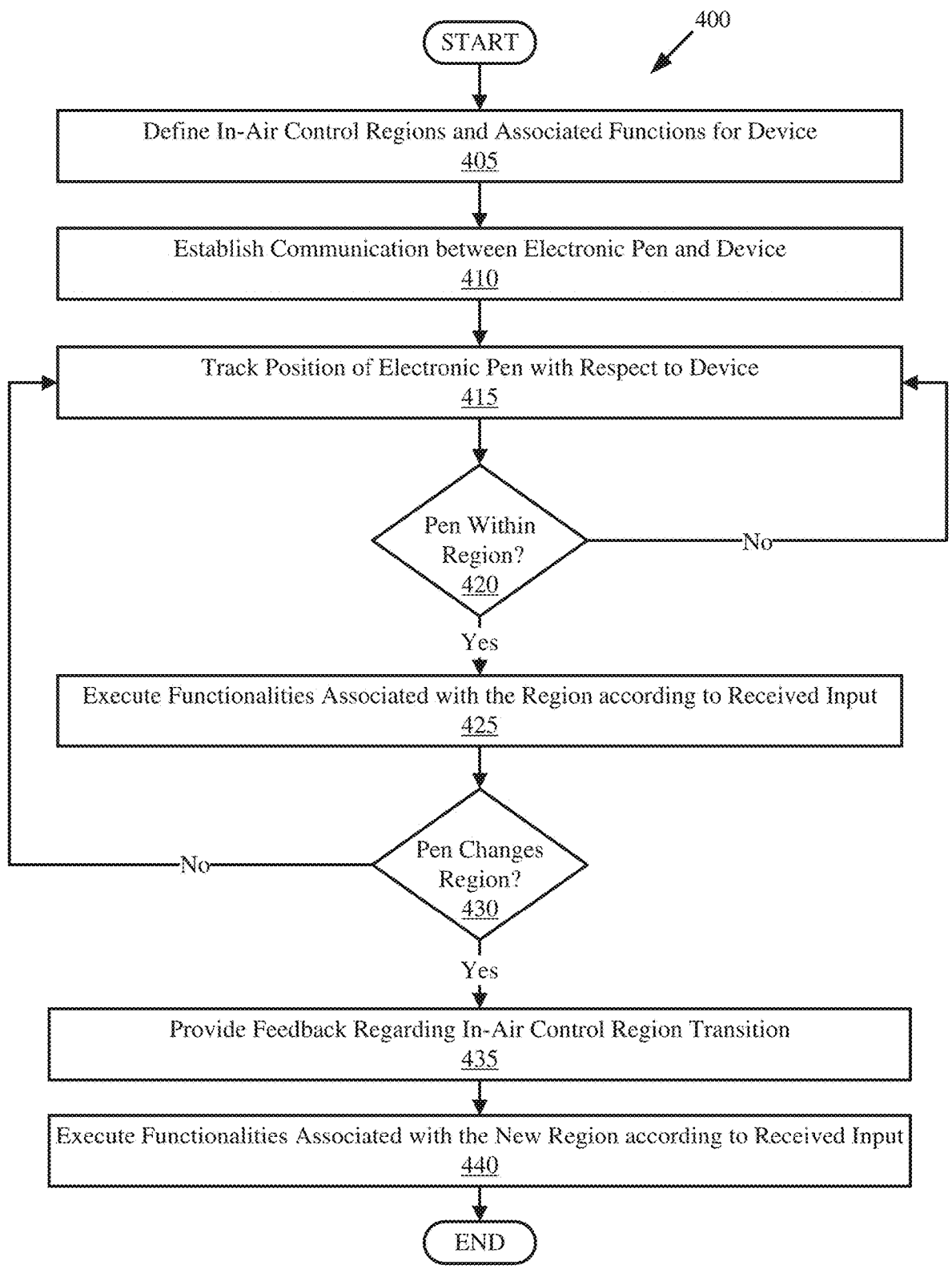
FIG. 4 is a flow-diagram illustrating an example method for in-air control region operation, in accordance with embodiments of the present disclosure.

Referring now to FIG. 4, shown is a flow-diagram illustrating an example method 400 for in-air control region operation, in accordance with embodiments of the present disclosure. One or more operations of method 400 can be completed by one or more computing devices (e.g., computer 101, electronic device 205, electronic pen 265, electronic device 305, electronic pen 350).

Method 400 initiates at operation 405, where in-air control regions and associated commands, functions, and/or permissions of each in-air control region are defined for a device (e.g., computer 101, electronic device 205, device 305). Definition of in-air control region placement/geometry can be completed in the same, or similar manners described with respect to FIG. 2 (e.g., manually or automatically). Definition/mapping of commands, functions, and/or permissions associated with each respective in-air control region can similarly be completed in the same, or a substantially similar manner, as described with respect to FIG. 2 (e.g., manually or automatically).

Communication (e.g., communicative coupling or pairing) between an electronic pen (e.g., electronic pen 265, electronic pen 350) and the device is established. This is illustrated at operation 410. Communication between the electronic pen and device can be completed in any suitable manner, such as a wireless network (e.g., Wi-Fi, Bluetooth, etc.).

A position of the electronic pen with respect to the device is determined. This is illustrated at operation 415. Tracking the position of the electronic pen with respect to the device can be completed in the same, or a substantially similar manner as described with respect to FIG. 2. For example, tracking the position of the electronic pen with respect to the device can be completed using one or more sensors (e.g., motion-based sensors, light-based sensors, network-based sensors, etc.).

A determination is made whether the electronic pen is within an in-air control region of the device. This is illustrated at operation 420. If a determination is made that the electronic pen is not within an in-air control region of the device ("No" at operation 420), then method 400 may return to operation 415, where the position of the electronic pen with respect to the device can continue to be determined. In embodiments, tracking of the electronic pen may only commence if the electronic pen is within a threshold range (e.g., a minimum distance) of the electronic device. In embodiments, tracking the position of the electronic pen with respect to the device can be performed intermittently, continuously, periodically, or over any other suitable interval.

If a determination is made that the electronic pen is within an in-air control region of the device ("Yes" at operation 420), then commands, functionalities, and/or permissions associated with the in-air control region the electronic pen is within are executed/enforced according to received input. This is illustrated at operation 425.

A determination is made whether the electronic pen changes (e.g., transitions) in-air control regions. This is illustrated at operation 430. Determining whether the electronic pen changes in-air control regions can be completed by tracking the position of the electronic pen with respect to the device. If a determination is made that the electronic pen has not changed in-air control regions ("No" at operation 430), then the position of the electronic pen with respect to the device can continue to be tracked to detect any in-air control region transitions that may occur.

If a determination is made that the electronic pen has changed in-air control regions ("Yes" at operation 430), then feedback (e.g., haptic, audio, and/or visual feedback) indicating the transition can be issued to a user of the electronic pen. This is illustrated at operation 435. Feedback can be issued from the electronic pen and/or from the device. In embodiments, a haptic actuator of the electronic pen provides haptic feedback to the user upon any in-air control region transition.

Commands, functions, and/or permissions associated with the new in-air control region can then be executed according to received input of the electronic pen. This is illustrated at operation 440.

The aforementioned operations can be completed in any order and are not limited to those described. Additionally, some, all, or none of the aforementioned operations can be completed, while still remaining within the spirit and scope of the present disclosure.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used, and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system comprising:
one or more processors; and
one or more computer-readable storage media collectively storing program instructions which, when executed by the one or more processors, are configured to cause the one or more processors associated with an electronic pen and a device to perform a method comprising:
establishing communication between the electronic pen and the device;
defining two or more in-air control regions above the device, each in-air control region specifying a set of functions that the electronic pen is configured to perform, wherein the two or more in-air control regions are displayed as virtual boundaries by an extended reality (XR) device worn by a user;

determining that the electronic pen is within a first in-air control region of the two or more in-air control regions, the first in-air control region specifying a first set of functions that the electronic pen is configured to perform; and executing, in response to input received from the electronic pen within the first in-air control region, at least one function of the first set of functions.

2. The system of claim 1, wherein the method performed by the one or more processors further comprises:

determining that the electronic pen transitioned from the first in-air control region of the two or more in-air control regions to a second in-air control region of the two or more in-air control regions, the second in-air control region specifying a second set of functions that the electronic pen is configured to perform; and generating, by a haptic actuator of the electronic pen, haptic feedback to notify a user of the electronic pen that the transition occurred.

3. The system of claim 2, wherein the method performed by the one or more processors further comprises:

executing, in response to input received from the electronic pen within the second in-air control region, at least one function of the second set of functions.

4. The system of claim 1, wherein the two or more in-air control regions are displayed as virtual boundaries by a holographic display of the device.

5. The system of claim 1, wherein the two or more in-air control regions are manually defined by a user.

6. The system of claim 5, wherein the two or more in-air control regions are manually defined by the user via in-air tracing.

7. The system of claim 1, wherein the two or more in-air control regions are automatically defined.

8. The system of claim 1, wherein at least one in-air control region of the two or more in-air control regions is manually defined and wherein at least one in-air control region of the two or more in-air control regions is automatically defined.

9. The system of claim 1, wherein the first in-air control region of the two or more in-air control regions has a first geometry and wherein a second in-air control region of the two or more in-air control regions has a second geometry.

10. The system of claim 1, wherein the first in-air control region is offset a distance above the device.

11. A method comprising:

establishing communication between an electronic pen and a device;

defining two or more in-air control regions above the device, each in-air control region specifying a set of functions that the electronic pen is configured to perform;

determining that the electronic pen is within a first in-air control region of the two or more in-air control regions, the first in-air control region specifying a first set of functions that the electronic pen is configured to perform;

executing, in response to input received from the electronic pen within the first in-air control region, at least one function of the first set of functions determining that the electronic pen transitioned from the first in-air control region of the two or more in-air control regions to a second in-air control region of the two or more in-air control regions, the second in-air control region specifying a second set of functions that the electronic pen is configured to perform; and generating, by a haptic actuator of the electronic pen, haptic feedback to notify a user of the electronic pen that the transition occurred.

12. The method of claim 11, further comprising:

executing, in response to input received from the electronic pen within the second in-air control region, at least one function of the second set of functions.

13. The method of claim 11, wherein the two or more in-air control regions are displayed as virtual boundaries by an extended reality (XR) device worn by a user.

14. The method of claim 11, wherein the two or more in-air control regions are displayed as virtual boundaries by a holographic display of the device.

15. A computer program product comprising one or more computer readable storage media, and program instructions collectively stored on the one or more computer readable storage media, the program instructions comprising instructions configured to cause one or more processors to perform a method comprising:

establishing communication between an electronic pen and a device;

defining two or more in-air control regions above the device, each in-air control region specifying a set of functions that the electronic pen is configured to perform, wherein the two or more in-air control regions are displayed as virtual boundaries by a holographic display of the device;

determining that the electronic pen is within a first in-air control region of the two or more in-air control regions, the first in-air control region specifying a first set of functions that the electronic pen is configured to perform; and executing, in response to input received from the electronic pen within the first in-air control region, at least one function of the first set of functions.

16. The computer program product of claim 15, wherein the method performed by the one or more processors further comprises:

determining that the electronic pen transitioned from the first in-air control region of the two or more in-air control regions to a second in-air control region of the two or more in-air control regions, the second in-air control region specifying a second set of functions that the electronic pen is configured to perform; and generating, by a haptic actuator of the electronic pen, haptic feedback to notify a user of the electronic pen that the transition occurred.

17. The computer program product of claim 16, wherein the method performed by the one or more processors further comprises:

executing, in response to input received from the electronic pen within the second in-air control region, at least one function of the second set of functions.

18. The computer program product of claim 15, wherein the two or more in-air control regions are displayed as virtual boundaries by an extended reality (XR) device worn by a user.

\* \* \* \* \*